United States Patent [19]

Jess et al.

[11] 4,070,723
[45] Jan. 31, 1978

[54] METHOD AND ARRANGEMENT FOR CONTROLLING THE FEEDING OF RODS TO A WORK TOOL IN AUTOMATIC SCREW MACHINES AND THE LIKE

[75] Inventors: Hans Jürgen Jess, Kronshagen; Karl-Heinz Friederichs, Kiel, both of Germany

[73] Assignee: Hagenuk Vormals Neufeldt & Kuhnke GmbH, Kiel, Germany

[21] Appl. No.: 293,375

[22] Filed: Sept. 29, 1972

[30] Foreign Application Priority Data

Oct. 2, 1971 Germany ............................. 2149319

[51] Int. Cl.² ...................... B21D 43/06; B23G 1/22; B23G 11/00; B26D 5/20
[52] U.S. Cl. ......................................... 10/90; 10/105; 72/4; 72/338; 72/419; 83/7; 83/207; 83/209; 83/276; 83/369; 214/1.5
[58] Field of Search ................... 83/62, 63, 66, 369, 83/70, 80, 208–211, 260, 263, 278, 286, 360, 370, 371; 214/1.4, 1.5; 226/48, 137, 139, 144, 145, 367; 10/205, 207 R, 207 PH, 90; 72/338, 419; 82/2.5, 48, 101, 102

[56] References Cited
U.S. PATENT DOCUMENTS

| 3,283,391 | 11/1966 | Thompson et al. | 10/90 X |
| 3,362,601 | 1/1968 | Ford et al. | 226/145 X |
| 3,393,589 | 7/1968 | Mills | 83/62 X |
| 3,513,741 | 5/1970 | Shallenberg | 83/278 |
| 3,640,164 | 2/1972 | Crawford | 83/66 X |
| 3,707,255 | 12/1972 | Ridgway | 226/139 X |
| 3,709,078 | 1/1973 | Mills | 83/62 X |
| 3,715,944 | 2/1973 | Knechtel et al. | 83/62 X |
| 3,776,073 | 12/1973 | Runge | 83/208 X |

FOREIGN PATENT DOCUMENTS 842,578  5/1970  Canada .................................... 83/63

Primary Examiner—C.W. Lanham
Assistant Examiner—D. M. Gurley
Attorney, Agent, or Firm—Michael J. Striker

[57] ABSTRACT

A method for automatically controlling the operation of a rod-working apparatus of the type including a rod-feeding unit which feeds towards a cyclically operating work tool a certain length of rod per work cycle of the tool. There are selected a minimum and a maximum distance through which a rod to be fed towards the work tool is to be permitted to advance per work cycle of the tool. A rod is fed towards and into the range of operation of the tool. The actual distance advanced by the rod during a work cycle of the tool is determined. It is also determined whether the actual distance of advancement falls within the range defined between the preselected minimum and maximum distances. When the actual distance falls outside such range, operation of the rod-feeding unit is terminated.

5 Claims, 1 Drawing Figure

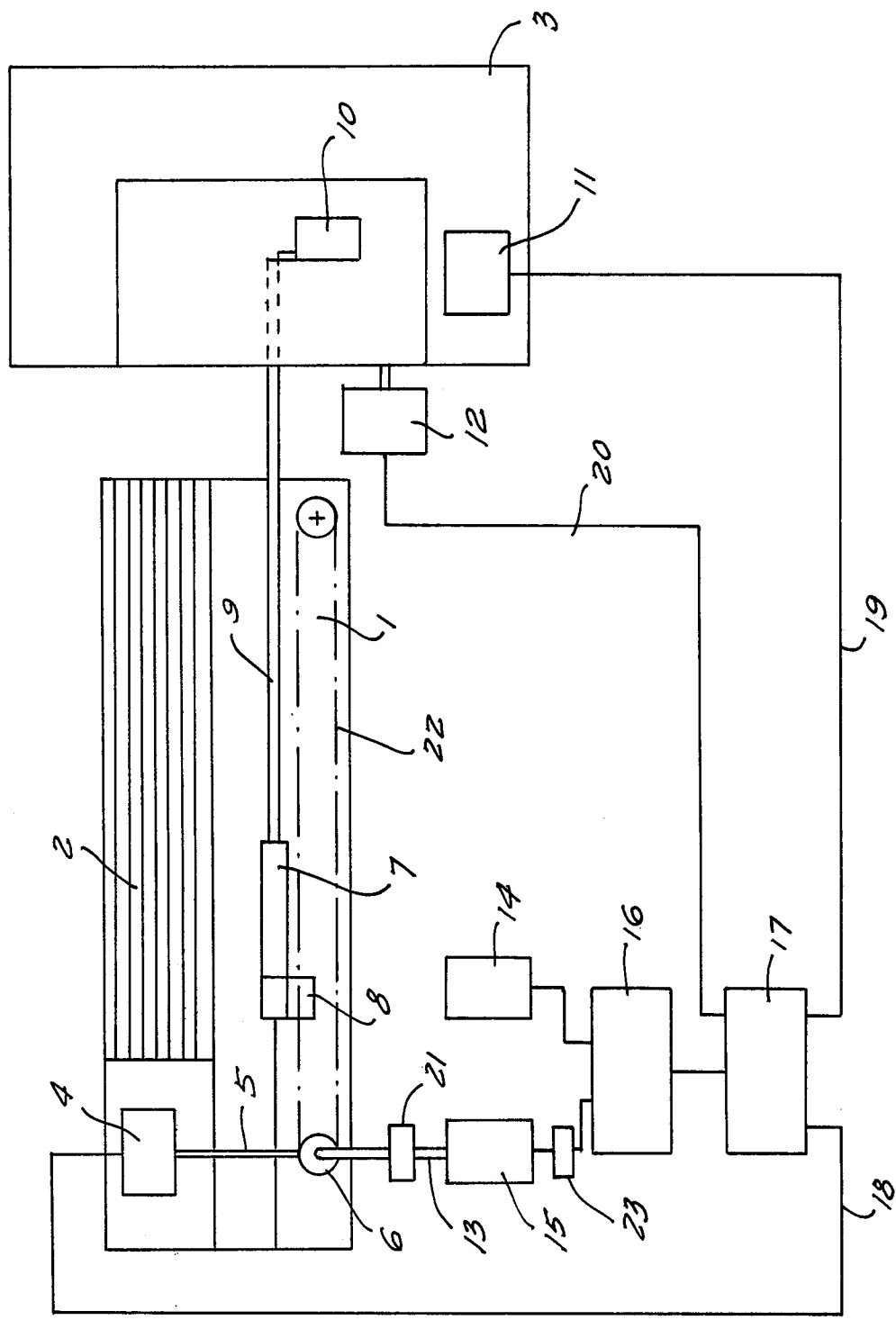

METHOD AND ARRANGEMENT FOR CONTROLLING THE FEEDING OF RODS TO A WORK TOOL IN AUTOMATIC SCREW MACHINES AND THE LIKE

The invention relates to the control of automatic chucking bar machines, automatic screw machines, and the like, and more specifically relates to the feeding of bar- and rod-shaped workpieces by the feeding mechanism of the machine towards the work tool of the machine.

It is known to increase the productivity of automatic screw machines by use of automatic bar-feeding mechanisms which automatically take rod-shaped stock from a storage unit. The conventional automatic rod-feeding mechanisms serve automatically for the feeding towards the work tool of a "new" rod, as soon as the "old" rod is used up.

The use of automatically operating, often program-controlled feeding mechanisms makes possible the operation of a large number of automatic chucking bar machines or automatic screw machines under the supervision of only one or a few operators, the operator or operators checking operation of each machine intermittently. Should jamming, breakdowns or other forms of faulty operation occur—for example because the automatic chucking mechanism of a bar machine becomes jammed—this may well remain unnoticed by the operator for a substantial period of time, and may be perceived by him only in the form of reduced productivity of the machine, if the faulty machine continues to operate. With conventional set-ups, a warning alarm for alerting the human operator will only be activated when the machine by reason of jamming or the like has come to a complete standstill.

Accordingly, it is the general purpose of the invention to provide a method and arrangement for the automatic control of the feeding of individual workpieces in such a manner that if the feeding of a workpiece does not occur, or if the rate of feeding or distance of feeding is incorrect, the machine will be brought to a halt and an alarm activated.

This object, and others which will become more understandable below, can be met according to one embodiment of the invention by a method for automatically controlling the operation of a rod-working apparatus of the type including a rod-feeding unit which feeds towards a cyclically operating work tool a certain length of rod per work cycle of the work tool, comprising the steps of selecting a minimum and a maximum distance through which a rod to be fed towards the tool is to be permitted to advance per work cycle of the tool, feeding a rod towards and into the range of operation of the tool, determining the actual distance advanced by the rod during a work cycle of the tool, determining whether such actual distance falls within the range defined between the minimum and maximum distances selected, and terminating operation of the rod-feeding unit when said actual distance falls outside said range.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The single FIGURE illustrates in very schematic form an automatic screw machine to be controlled according to the invention, together with means for controlling operation of the machine.

The rod-feeding unit of the illustrated machine is generally designated by reference numeral 1 and includes a storage unit 2 for rod- or bar-shaped stock. Reference numeral 3 identifies in general the working station which contains any of various conventional work tools supported in conventional manner on slides. The drive means of the working station is identified generally with reference numeral 11. Reference numeral 4 designates the drive means for the rod-feeding unit 1, the output of drive means 4 being mechanically connected by connecting means 5 to the sprocket wheel 6 for a drive chain 22. The sprocket wheel 6 in turn has an output shaft 13 connected to one side of an electromagnetic clutch unit 21. The other side of clutch unit 21 is connected to the input shaft of electromechanical transducer 15, discussed below.

Reference numeral 9 designates a rod-shaped workpiece engaged by the rod-advancing means 7 and being advanced towards the work tool 10 of the working station 3. The driving chain 22 driven by sprocket wheel 6 is connected to the schematically indicated rod-advancing means 7 by means of lug 8.

The showing of the automatic screw machine in the FIGURE is extremely schematic, for purposes of simplicity. The actual construction of such machines is exceedingly well known and does not per se form part of the invention. The invention can readily be understood by considering the automatic screw machine in functional terms only. It is noted, for example, that neither the automatic chucking mechanism nor the guide pipe in which the rod-shaped workpiece is held, is shown in the drawing, since such illustration is not considered necessary and would not add anything to an appreciation of the invention.

The work tool or work tools of the type of rod-working machine in question operate cyclically, that is, they perform a plurality of complete cycles on a single rod- or bar-shaped workpiece. At its simplest, for example, a 5-foot long bar may be cut into 10 6-inch-long segmemts at the working station. Such an operation might include the formation of screw threads over three inches of the length of each of such 10 rod segments prior to the cutting off of each such segment from the rod-shaped workpiece. Understandably, the movement of the rod must be coordinated with the operaton of the work tool or tools and the cut off tool, so that a predetermined length of rod is fed into the range of operation of the work tools per work cycle of the tool. In the example just mentioned, if a 5-foot-long rod is to be cut into 10 partially threaded segments, then it is of course necessary that the rod-shaped workpiece be fed exactly 6 inches towards the work tool per work tool operating cycle. The invention relates specifically to the feeding of the workpiece towards the work tool to the proper extent per work tool operating cycle.

Selecting means 14 is provided for selecting the distance through which the rod 9 is to be advanced towards work tool 10 per operating cycle of the work tool. The duration of the operating cycle of the work tool may for example be the length of time between successive activations of the cutoff means which cuts off rod segments. Advantageously, selecting means 14 may be operative for selecting the minimum and maximum distances through which the rod to be fed towards the work tool is to be permitted to advance per work tool operating cycle. In effect, a tolerance range for the rod working machine can thus be set upon the setting of selecting means 14.

The internal circuitry and structure of selecting means 14 is not per se part of the invention. Selecting means 14 may for example include two settable or permanently set transducers which respectively furnish one electrical signal proportional to the minimum permissible advancement distance and another signal proportional to the maximum permissible advancement distance, as just one of many possibilties.

In the embodiment illustrated, means 15 is provided for determining the actual distance advanced by rod 9 during one cycle of operation of work tool 10. Means 15 is in effect an electromechanical transducer having an input shaft the angle of rotation of which determines the magnitude of the electrical signal produced at the output of means 15. The input shaft of means 15 can be coupled to the shaft of sprocket wheel 6 by means of electromagnetically actuated clutch 21. Once per operating cycle of the work tool, clutch 21 is automatically activated, resulting in joint rotation of sprocket wheel 6 and the input shaft of means 15. Wheel 6 and the input shaft of means 15 are maintained in operative engagement during the advancement of a rod during one operating cycle of the work tool, and at the end of such advancement during such one work tool operating cycle the clutch 21 is de-activated, so that the total advancement distance registered on means 15 is the advancement distance for the work tool operating cycle. The electrical signal at the output of means 15 is indicative of this distance, and is stored in an information-storage unit 23. Immediately after the declutching of the input shaft of means 15 and the shaft of sprocket wheel 6, non-illustrated return spring means returns the non-illustrated moving parts of means 15 to their starting position, resulting in a return of the output signal of means 15 to a value indicating zero advancement of the rod-shaped workpiece. The return to starting condition of transducer means 15 is what necessitates provision of the storage unit 23.

The electrical signal stored in means 23 and the electrical signals at the outputs of selecting means 14 are applied to a logic circuit 16 which determines whether the actual distance advanced by the rod 9 during one working cycle of the work tool fails within the range defined between the preselected minimum and maximum permissible advancement distances.

The internal circuitry of logic circuit 16 has not been illustrated, inasmuch as the implementation of such logical functions is exceedingly well known and conventional.

If the actual distance of rod advancement falls within the predetermined tolerance range, operation of the automatic screw machine proceeds without interruption.

However, if the actual distance of rod advancement falls outside the preselected tolerance range an activating signal is applied to switch-off unit 17.

Immediately upon receipt of an activating signal, switch-off unit 17 sends a switch-off signal via line 18 to the drive means 4 of the rod-feeding unit 1.

Switch-off unit 17 has another output 19 over which it furnishes a switch-off signal to the drive means 11 of working station 3. However, whereas drive means 4 is switched off immediately upon a determination of faulty feeding operation, drive means 11 is not switched off until the working station is returned to its null position, i.e., until the automatic jaw is reopened and the work tool or tools are at their starting position. In order to delay the switching off of drive means 11 in the manner just described, monitoring means 12 is provided. Monitoring means 12 has an output 20 and furnishes a gating signal to switch-off means 17 only when work tool 10 has assumed its null position. When in fact the null position is reached, switch-off means will furnish via its output 19 a switch-off signal to drive means 11, terminating operation of drive means 11.

As one possibility for means 14, 15 and 16, each of means 14 and 15 may include a potentiometer, with means 16 being a voltage comparator.

In another version, means 15 can have the form of a pulse generator applying pulses to means 14 which could be provided in the form of a pulse counter, which terminates operation of the drive means 4 and then 11 when the pulse count indicates that improper feeding has occurred.

In a particularly advantageous embodiment of the invention, means 15 at the driven side of the clutch 13 includes a cam-disk which at a predetermined point in its cycle of rotation closes an electrical contact. The contact can be moved as a function of the desired advancement distance per working cycle and circuit 17 would then be operative to generate switch-off signals when the rod is not advanced the desired distance within a predetermined time from the closing of such electrical contact. This predetermined time would be set by means 14. Clearly, this expedient is most practical when the feeding rate is substantially constant.

It has already been mentioned that upon a determination of faulty feeding, the feeding unit is switched off immediately, whereas the drive means 11 for the working station is switched off only when the work tool has returned to its null position. It has also been mentioned that monitoring means 12 does not permit switch-off means 17 to furnish a switch-off signal via line 19 until the null condition at the working station has been reached. As one possibility, switch-off means 17 may include an intermediary storage unit for storing the switch-off signal until monitoring means 12 determines that the null position has been reached. Such an intermediate storage, which is not separately illustrated, so acts that in other respects the program-control for the normal functioning of the feeding unit can remain unimpaired at the working stroke. In this way, it is eliminated that upon remedying the source of trouble, a new feeding cycle must take place before an actual rod is again fed, in the subsequent cycle, into the work tool.

Three of the main advantages of the illustrated embodiment are these:

1. The inventive method and arrangement take into account not only the possibility that the workpiece advancement distance will be too short, but also the possibility that the workpiece advancement distance is exceeded, and a threshold value for the suppression of trouble signals is provided. An excessive workpiece advancement distance is for example possible, if the feeding unit is defective, for example if the drive chain is broken, etc. In response to such faulty feeding action, the machine is brought to a standstill.

2. The switching condition of the machine control prevailing upon generation of the switch-off signal terminating operation of the machine (upon the last trouble-free working cycle performed) persists, so that after the trouble has been eliminated the working process can continue without further loss of time.

3. Upon a determination of faulty feeding, the drive means for the feeding unit is turned off immediately, whereas the drive means for the working station is turned off only when the null position of the working station has been reached, i.e., only when the automatic chuck is in open position and when the work tool has returned to its starting position, in order to avoid damage to the work tool.

It will be understood that each of the elements described above, or two or more together, may also find a useful application in other types of constructions differing from the types described above.

While the invention has been illustrated and described as embodied in a control arrangement for automatic chucking bar machines, automatic screw machines, and the like, it is not intended to be limited to the details shown, since various modificaions and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic of specific aspects of this invention and, therefore such adaptations should and are intended to be comprehended within the meaning and range of equivalence of the following claims.

What is claimed as new and desired to be protected by Letters Patent is set forth in the appended claims:

1. A method for automatically monitoring and controlling the operation of a rod-working apparatus of the type including an automatically operating rod-feeding unit which feeds towards a cyclically operating work tool a certain length of rod per work cycle of the tool, comprising the steps of selecting a minimum and maximum distance through which a rod to be fed towards the tool is to be permitted to advance per work cycle of the tool; feeding a rod towards and into the range of operation of the tool; determining the actual distance advanced by said rod during a work cycle of said tool; determining whether said actual distance falls within the range defined between said minimum and maximum distances; terminating operations of said rod-feeding unit when said actual distance falls outside said range, said cyclically operating work tool having a null position which it assumes at the beginning of its work cycles; and further comprising the step of terminating operation of said work tool upon a determination that said actual distance falls outside said range but only when said work tool has been allowed to return to said null position thereof.

2. A method as defined in claim 1, wherein said step of terminating operation of said rod-feeding unit comprises terminating operation of said unit immediately upon a determination that said actual distance falls outside said range.

3. In an arrangement for working rod-shaped articles, in combination, a cyclically operating work tool having a null position which it assumes at the beginning of its work cycle; an automatically operating rod-feeding unit for feeding rods to be worked into the range of operation of said tool and including pushing means for pushing a rod to be worked into the range of operation of said tool; selecting means for selecting a minimum and a maximum distance through which a rod to be fed by said unit towards said tool is to be permitted to advance per work cycle of said tool; means for determining the actual distance advanced by said rod during a work cycle of said tool; means for determining whether said actual distance falls within the range defined between said minimum and maximum distances; means for terminating operation of said rod-feeding unit when said actual distance falls outside said range; and means for terminating operation of said work tool upon a determination that said actual distance falls outside said range but only after said work tool has returned to said null position thereof.

4. The arrangement defined in claim 3, wherein said means for terminating operation of said rod-feeding unit comprises means for terminating operation of said rod-feeding unit immediately upon determination that said actual distance falls outside said range.

5. A method of automatically monitoring and controlling the operation of a rod-working apparatus of the type including an automatically operating rod-feeding unit which longitudinally feeds a certain increment of a rod towards a cyclically operating work tool per work cycle of the work tool and which includes engaging means for engaging the rod and travelling longitudinally with the rod along the path of longitudinal movement of the rod towards the work tool, comprising the steps of selecting a minimum and a maximum distance through which a rod is to be longitudinally fed towards the tool is to be permitted to advance per work cycle of the tool; longitudinally feeding a rod towards and into the range of operation of the tool using said rod-feeding unit with said engaging means in engagement with said rod; determining the actual longitudinal distance advanced by said rod during a work cycle of said tool by determining the longitudinal distance traveled by said engaging means during a work cycle of said tool; determining whether said longitudinal distance traveled by said engaging means falls within the range defined between said minimum and maximum distances; terminating operation of said rod-feeding unit when said longitudinal distance traveled by said engaging means falls outside said range; said step of feeding a rod comprises feeding successive segments of said rod into the range of operation of the tool by moving said rod in discrete successive steps towards said tool using said rod-feeding unit with said engaging means in engagement with said rod, one step per work cycle of said tool, said tool being operative per work cycle for cutting off the segment of rod fed into the range of operation thereof during such work cycle; said step of terminating operation comprises terminating operation of said rod-feeding unit before all of the segments of the rod being fed have entered into the range of operation of said work tool; subsequently effecting a resumption of the feeding by said rod-feeding unit of the incompletely fed rod; said cyclically operating work tool having a null position which it assumes at the beginning of each of its work cycles; and further comprising the step of terminating operation of said work tool upon a determination that said actual distance falls outside said range but only when said work tool has been allowed to return to said null position thereof.

* * * * *